United States Patent [19]
Kelbel et al.

[11] 4,133,219
[45] Jan. 9, 1979

[54] TRANSMISSION SHIFT CONTROL MECHANISM

[75] Inventors: Donald W. Kelbel; Jack M. Fisher, both of Muncie, Ind.

[73] Assignee: Borg-Warner Corporation, Chicago, Ill.

[21] Appl. No.: 791,451

[22] Filed: Apr. 27, 1977

[51] Int. Cl.² ............................................. F16H 57/06
[52] U.S. Cl. ................................... 74/476; 74/473 P; 74/523
[58] Field of Search ..................... 74/476, 473 P, 523

[56] References Cited

U.S. PATENT DOCUMENTS

| 3,422,697 | 1/1969 | Brown | 74/473 P |
| 3,929,029 | 12/1975 | Kelbel | 74/473 R |

FOREIGN PATENT DOCUMENTS 1276460  3/1965  Fed. Rep. of Germany ............ 74/523

Primary Examiner—Samuel Scott
Assistant Examiner—Gerald A. Anderson
Attorney, Agent, or Firm—Julian Schachner

[57] ABSTRACT

A shift control mechanism for a manual transmission incorporates a control lever with a ball fulcrum, and a reversing lever between the ball fulcrum and the shift rail. The mechanism acts as a rigid lever in crossover in one direction, and acts as an articulated lever to provide fore and aft motion of the shift rail in the other direction. A positive reverse inhibitor allows shifting into first or reverse from neutral, but prevents shifting into reverse from first.

3 Claims, 11 Drawing Figures

U.S. Patent    Jan. 9, 1979    Sheet 1 of 3    4,133,219
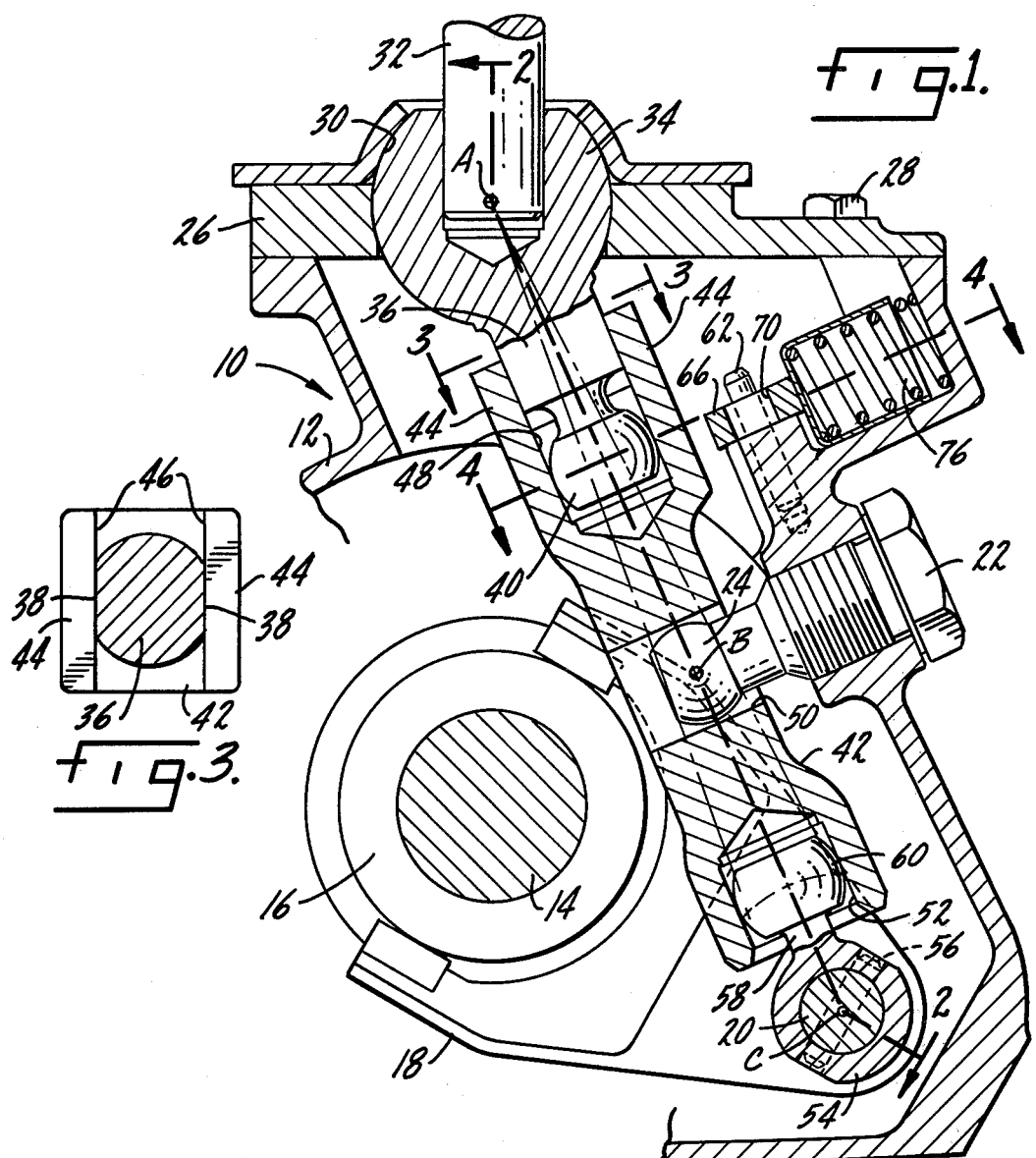
fig.1.
fig.3.
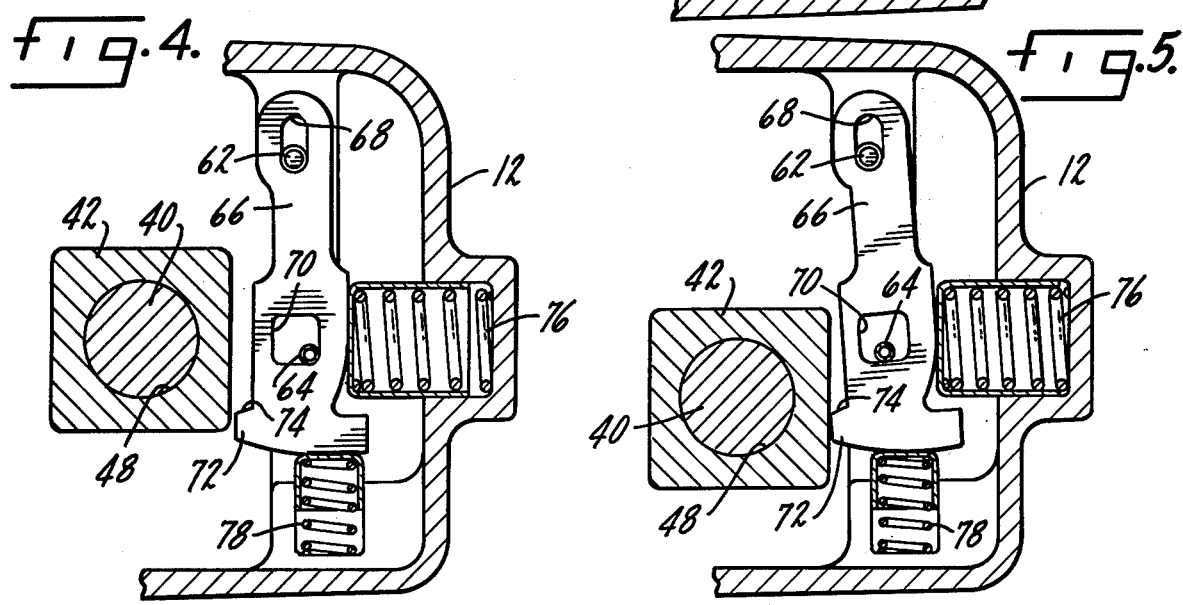
fig.4.    fig.5.

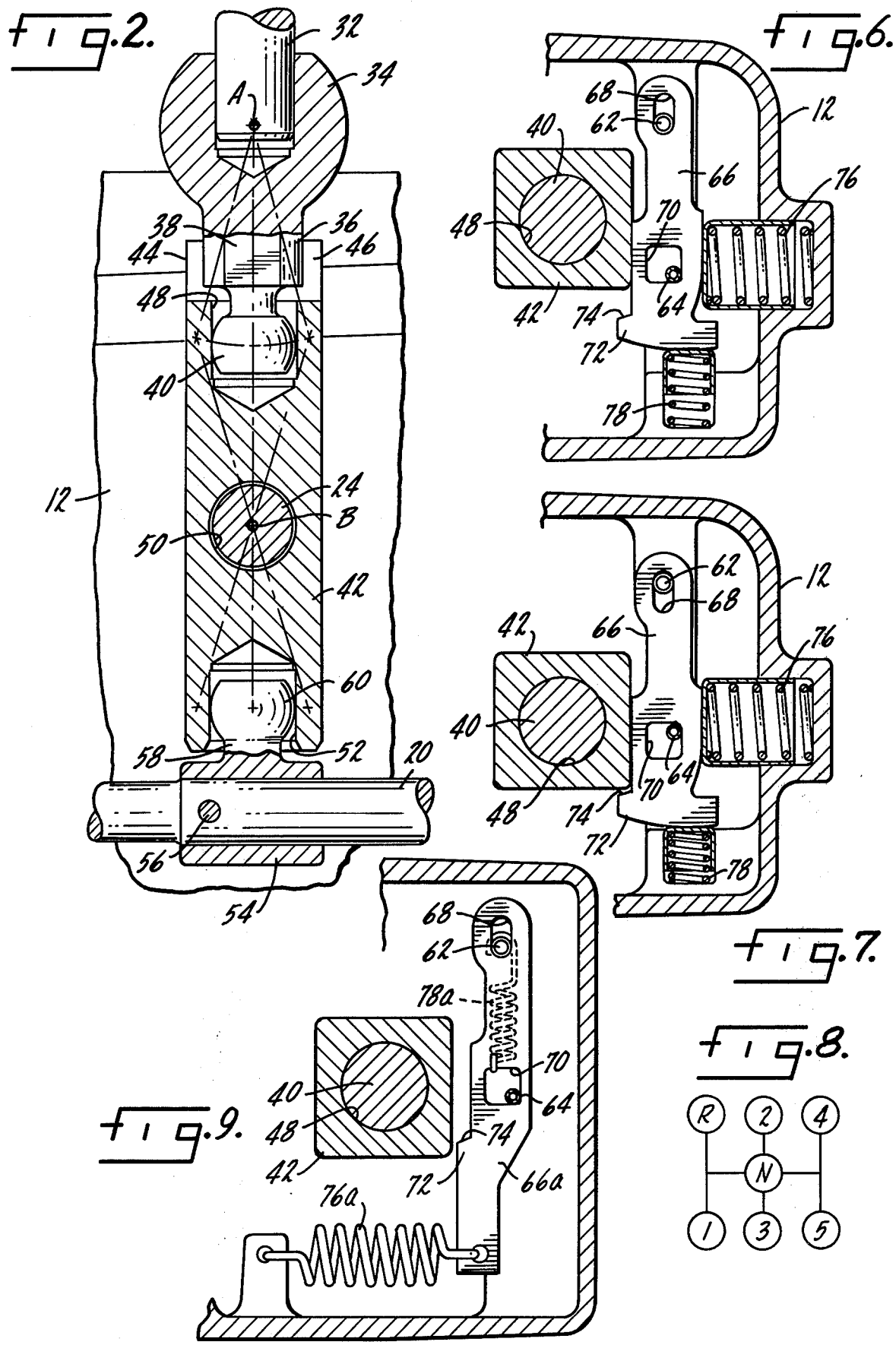

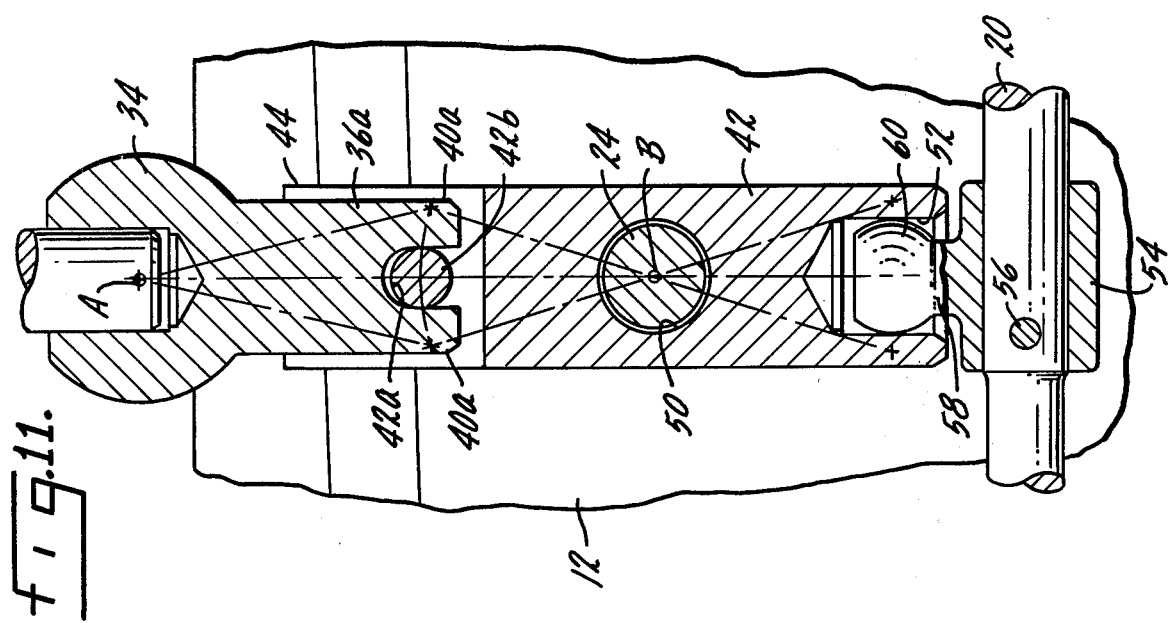
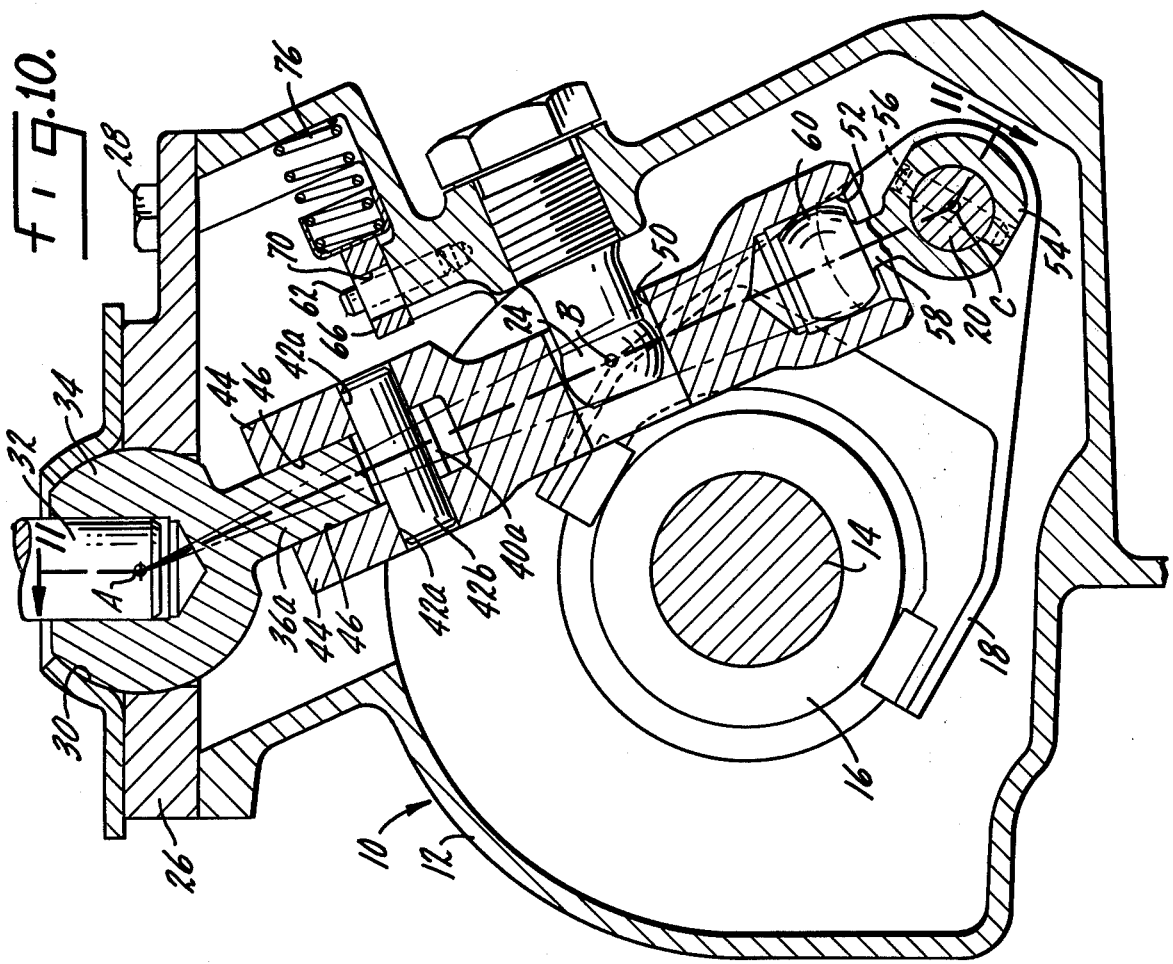

TRANSMISSION SHIFT CONTROL MECHANISM

BACKGROUND OF THE INVENTION

This invention relates generally to the control of automotive transmissions or the like. More particularly, it relates to an improved control mechanism for a manual transmission.

In recent years there have been many improvements in automotive transmissions, including improvements relating to the shifting of sliding gear manual transmissions. One such transmission is disclosed in U.S. Pat. No. 3,916,718 issued Nov. 4, 1975 and U.S. Pat. No. 3,929,029 issued Dec. 30, 1975. U.S. Pat. No. 3,916,718 discloses a shift tower having a shift control lever movable about a floating pivot. First and second shift rails are provided, and are connected by a suitable link element. The shift control lever is connected to the first shift rail such that movement in one direction causes rotation and movement in another direction causes longitudinal movement of this shift rail. These movements are transmitted to the other shift rail by the link element to provide rotational and longitudinal movement thereof.

One disadvantage of this arrangement is the requirement that the shift control lever be mounted in a floating pivot. Another disadvantage is the requirement for two shift rails. This results in a complex linkage arrangement as well as a bulky apparatus, which in turn requires a large extension housing for the transmission. Another disadvantage is that no reverse inhibitor is provided.

SUMMARY OF THE INVENTION

One of the objects of this invention is to overcome the disadvantage noted above. To that end, the invention discloses a shift control mechanism which incorporates a fixed support for a control lever. A link member connects the control lever with a single shift rail. The control lever and link member are arranged to act as a single, rigid lever mechanism during crossover selection, and to act as articulated linkage to provide fore and aft motion of the shift rail. The invention herein also provides a positive reverse inhibiting mechanism which allows shifting from neutral into first or reverse, but which prevents shifting from first directly into reverse. The arrangement herein further provides for easy assembly of the shift control mechanism by simply plugging the shift control lever into the transmission during assembly of an associated automotive vehicle by a manufacturer.

BRIEF DESCRIPTION OF THE DRAWINGS

The objects and advantages of this invention will become apparent to those skilled in the art upon careful consideration of the specification herein, including the drawings, wherein:

FIG. 1 is a sectional view taken transversely through an associated transmission showing details of the shift control mechanism;

FIG. 2 is a sectional view taken along the line 2—2 of FIG. 1 showing additional details of the shift control mechanism;

FIG. 3 is a sectional view taken along the line 3—3 of FIG. 1 showing another detail of the shift control mechanism.

FIG. 4 is a sectional view taken along the line 4—4 of FIG. 1 showing the shift control mechanism in the neutral position;

FIG. 5 is a sectional view similar to FIG. 4 showing the shift control mechanism in the reverse gear position;

FIG. 6 is a sectional view similar to FIG. 4 showing the shift control mechanism in the first gear position;

FIG. 7 is a sectional view similar to FIG. 4 showing the reverse inhibitor blocking movement of the shift control mechanism to the reverse gear position;

FIG. 8 is a diagram showing the shift pattern for establishing the various gear ratios as viewed from the operator's position;

FIG. 9 is a sectional view similar to FIG. 4 showing details of a modified reverse inhibitor;

FIG. 10 is a sectional view similar to FIG. 1 showing details of a modified shift control mechanism and;

FIG. 11 is a sectional view taken along the line 11—11 of FIG. 10 showing additional details of the modified shift control mechanism.

While this invention is susceptible of embodiment in many different forms, there is shown in the drawings and herein will be described in detail a preferred embodiment, with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, a multiple speed manual transmission 10 may be of the type disclosed in the aforementioned U.S. Pat. Nos. 3,916,718 and 3,929,029. Transmission 10 includes as a portion thereof an extension housing 12, through which passes a main shaft 14. A plurality of synchronizers, one of which is shown at 16, is associated with main shaft 14 for selectively engaging various gears, not shown, in order to establish the desired gear ratios. Similarly, a plurality of shift forks, one of which is shown at 18, is associated with synchronizers 16 to actuate them selectively. A shift element or rail 20 is rotatable to selectively engage one of the shift forks 18, and is slidable axially for moving the selected shift fork so as to actuate its associated synchronizer 16.

A suitable bolt 22 or the like is threaded to extension housing 12 and defines a guide or ball 24 at the interior end thereof. A cover 26 is secured to extension housing 12 by suitable bolts 28 or the like. Cover 26 defines a fixed socket 30.

A shift control lever 32 is adapted to be moved by the operator of an associated automotive vehicle. Shift control lever 32 has at one end thereof a ball 34 seated in socket 30. The relationship of ball 34 and socket 30 is such that movement of shift lever 32 causes rotation of ball 34 about point A. Ball 34 defines a projection 36 having flat surfaces 38 at opposed sides thereof and a ball 40 at the innermost end thereof.

A link member 42 is bifurcated at one end thereof to define a pair of spaced forks 44, each of which has a flat inner surface 46. Link member 42 also defines a bore 48. Projection 36 of ball 34 extends between forks 44 such that surfaces 38 and 46 are in sliding contact. In this position ball 40 extends into bore 48. Link member 42 further defines a transverse bore 50, into which extends ball 24 of bolt 22. At its other end, link member 42 defines a bore 52. A sleeve 54 is secured to shift rail 20 by a suitable pin 56 or the like. Sleeve 54 defines an extension 58 having a ball 60 at the innermost end thereof. Ball 60 extends into bore 52.

Rotation of shift control lever 32 and ball 34 about point A, as shown in FIG. 1, corresponds to horizontal movement of projection 36, as shown in FIG. 3. Projection 36 carries link member 42, which also rotates about point A. Link member 42 pivots ball 60, which in turn causes sleeve 54 and shift rail 20 to rotate about point C. With control lever 32 and link member 42 acting as a single, rigid lever assembly, clockwise rotation, for example, of control lever 32 about point A causes counterclockwise rotation of shift rail 20 about point C.

Rotation of control lever 32 and ball 34 about point A, as shown in FIG. 2, corresponds to vertical movement of projection 36, as shown in FIG. 3. Projection 36 slides between forks 44 of link member 42. Ball 40 causes link member 42 to pivot about point B. Link member 42 acts through ball 60 to cause sleeve 54 and shift rail 20 to move horizontally, as shown in FIG. 2, along the longitudinal axis of shift rail 20. Thus, control lever 32 and link member 42 act as an articulated linkage assembly. Clockwise rotation of control lever 32, as shown in FIG. 2, causes rightward movement of shift rail 20.

As disclosed in detail in the aforementioned U.S. Pat. No. 3,929,029, rotation of shift rail 20 selects one of shift forks 18, and axial movement of shift rail 20 causes the shift fork so selected to actuate its associated synchronizer 16. The result of this arrangement is the shift pattern shown in FIG. 8, as viewed from the operator's position.

The positive reverse inhibiting mechanism includes a pair of pins 62 and 64 secured to extension housing 12. A blocking element 66 defines an elongated slot 68 about pin 62 so as to allow reciprocating movement of element 66 relative to pin 62. Element 66 also defines a square slot 70 about pin 64 so as to allow free movement of element 66 relative to pin 64. Further, element 66 defines a tab 72 having a sloping surface 74 thereon. Tab 72 is adjacent to link member 42. A spring 76 reacts against extension housing 12 and biases element 66 toward link member 42 and against pin 64. Similarly a spring 78 reacts against extension housing 12 and biases element 66 against pin 62.

As shown in FIG. 1, control lever 32 and link member 44 are in the neutral position. Counterclockwise rotation of control lever 32 about point A causes clockwise rotation of shift rail 20 about point C, and the first/reverse shift fork 18 is selected. Link member 42 is moved to the right from the position shown in FIG. 4. Element 66 is pivoted about pin 62, compressing spring 76.

As shown in FIG. 2, counterclockwise rotation of control lever 32 causes leftward movement of shift rail 20. This corresponds to downward movement of link member 42 to the position shown in FIG. 5 to engage reverse gear. Similarly, clockwise rotation of control lever 32 causes rightward movement of shift rail 20. This corresponds to upward movement of link member 42 to the position shown in FIG. 6 to engage first gear.

To shift from first gear into second gear, the operator moves control lever 32 upwardly, rightwardly and upwardly, as shown in FIG. 8. This moves link member 42 downwardly from the position shown in FIG. 6 to the neutral position shown in FIG. 7, and then leftwardly and downwardly to engage second gear.

As shown in FIG. 7, tab 72 engages link member 42 and prevents its continued downward movement beyond neutral in the first/reverse plane. Element 66 is carried downwardly, and compresses spring 78 until element 66 reaches the limit of its downward travel, corresponding to movement of link member 42 from first to neutral. The force of spring 78 exerts a resistance which is felt by the operator, and the slope of surface 74 tends to cam link member 42 leftwardly, as shown in FIG. 7, toward the second/third plane.

FIG. 9 shows a modified form of the positive reverse inhibiting assembly. Element 66a defines slots 68 and 70 respectively associated with pins 62 and 64. Springs 76a and 78a respectively replace springs 76 and 78. The operation of the assembly as shown in FIG. 9 is the same as that of FIG. 4.

As shown in FIGS. 10 and 11, a modified form of the control linkage assembly includes ball 34 which defines a projection 36a. Projection 36a is bifurcated to define a pair of spaced forks 40a. Link member 42 defines a bore 42a extending transversely therethrough, in which is secured a pin 42b. Forks 40a of projection 36 straddle pin 42b.

It will be seen that the operation of the assembly of FIGS. 10 and 11 is the same as that of FIGS. 1 and 2. As shown in FIG. 10, rotation of control lever 32 about point A causes unitary rotation of link member 42 about point A. This results in rotation of shift rail 20 about point C. Similarly, rotation of control lever 32 about point A, as shown in FIG. 11, causes link member 42 to pivot about point B, and this results in axial movement of shift rail 20.

As will be seen from the drawings, control lever 32 and ball 34 can be dropped into position from above during assembly of an associated vehicle by the manufacturer. This results in a simplified assembly procedure, wherein the transmission may be installed from below, and the control lever dropped in from above.

Thus it will be seen that the shift control mechanism includes a control lever mounted in a ball and socket fulcrum in the control cover. Connected to the ball is a link member which is supported on the extension housing by a ball joint fulcrum. Connected to the link member by another ball joint fulcrum is a shift rail. The control lever and link member act as a single, rigid lever in one plane, and as an articulated lever in another plane.

The arrangement is such that a single shift rail, rather than a pair of shift rails, is all that is necessary for proper actuation to engage the various gears. This results in a simple, compact control assembly which can be mounted in a shortened extension housing.

A positive reverse inhibiting assembly allows shifting to first or reverse from neutral, but prevents shifting from first directly to reverse.

The transmission shift control mechanism disclosed herein constitutes a preferred embodiment of the invention. This should be considered as illustrative, and may be modified by those skilled in the art without departing from the scope of the invention, which is to be limited only by the claims herein.

We claim:

1. A transmission shift control mechanism comprising a control lever supported for movement in two directions, a link member connected with said control lever for rigid movement therewith upon movement of said control lever in one direction and for articulated movement relative thereto upon movement of said control lever in another direction, a shift element connected with said link member for articulated movement relative thereto in a first direction for selecting transmission ratios upon movement of said control lever in said one direction and for articulated movement relative thereto in a second direction for engaging transmission ratios upon movement of said control lever in said other direction, said link member being movable for effecting movement of said shift element to at least two selecting positions upon said movement of said control lever in said one direction and for effecting movement of said shift element to two engaging positions upon said movement of said control lever in said other direction, and means for inhibiting said movement of said link member to one of said engaging positions after movement thereof sequentially to one of said selecting positions and the other of said engaging positions.

2. The invention of claim 1, said control lever being supported for rotation in two planes about a first fixed point, said link member being connected to said control lever for rotation therewith about said first fixed point upon rotation of said control lever in one plane and for rotation about a second point upon rotation of said control lever in another plane, said shift element being connected to said link member for rotation about a third point upon rotation of said control lever in said one plane and for movement along its longitudinal axis upon rotation of said control lever in said other plane, and said inhibiting means including means for blocking rotation of said link member about said second point in one direction after rotation thereof about said second point in the opposite direction.

3. The invention of claim 2 said blocking means being constructed and arranged to allow rotation of said link member about said second point in said one direction before rotation thereof about said second point in said opposite direction.